United States Patent [19]

Wheeler

[11] Patent Number: 4,514,888

[45] Date of Patent: May 7, 1985

[54] APPARATUS FOR INSTALLING A TENSION COIL SPRING

[75] Inventor: Louis B. Wheeler, Birmingham, Ala.

[73] Assignee: Combustion Engineering, Inc., Windsor, Conn.

[21] Appl. No.: 481,001

[22] Filed: Mar. 31, 1983

[51] Int. Cl.[3] ............................................. B23P 19/04

[52] U.S. Cl. .................................... 29/227; 254/10.5; 269/11

[58] Field of Search ......................... 29/227, 267, 225; 254/10.5; 269/11; 7/170, 104, 167

[56] References Cited

U.S. PATENT DOCUMENTS 1,050,746 1/1913 Morgan ................................ 29/227
3,178,808 4/1965 Pendley ................................ 29/227
3,863,910 2/1975 Warax .................................. 269/11

*Primary Examiner*—Frederick R. Schmidt
*Assistant Examiner*—Steven P. Schad
*Attorney, Agent, or Firm*—William W. Habelt

[57] ABSTRACT

An apparatus (40) for installing a coil spring (30) under tension between the discharge electrode wires (20) of a rigid-frame type electrostatic precipitator (10). The installation apparatus (40) comprises a longitudinally elongated support rod (42), first spring engagement pin (54) mounted stationarily to the outboard end (44) of the support rod, second spring engagement pin (64) supported from and translatably movable along the support rod, and spring tensioning device (70) for selectively positioning the second spring engagement pin (64) at the proper position along the support rod (42) so as to elongate the spring to the proper length necessary to slip the ends (34) of the spring about and between the discharge electrode wires (20).

6 Claims, 4 Drawing Figures

APPARATUS FOR INSTALLING A TENSION COIL SPRING

BACKGROUND OF THE INVENTION

The present invention relates to an apparatus for installing a tension coil spring to be installed under tension and, more particularly, to an apparatus for installing a tension coil spring under tension between the discharge electrode wires of a rigid-frame type electrostatic precipitator.

In the operation of an electrostatic precipitator, a gas laden with entrained particulate material is passed through an electrostatic field established about a discharge electrode disposed between two grounded collector electrodes. The suspended particles become electrically charged as they pass through the electrostatic field and move, under the influence of the electrostatic field, to and deposit upon the grounded collection electrodes flanking the discharge electrode.

Typically, each collecting electrode is formed of one or more elongated plates disposed in a row side by side and suspended from top of the precipitator housing in a vertical plane. A plurality of such collecting electrodes are disposed transversely across the precipitator casing in spaced vertical planes parallel to the direction of the gas flow through the precipitator.

In what is commonly referred to as a rigid-frame electrostatic precipitator, a box-like framework comprised of a plurality of discharged electrode frame is suspended from insulators at the top of the precipitator housing to provide a row of vertically disposed discharge electrodes between adjacent collecting electrodes across the width of the precipitator. A voltage is applied to discharge electrodes to demonstrate the electrostatic field.

Each discharge electrode frame is comprised of a plurality of individual discharge electrode wires tautly strung across a support frame. As electrode wires are installed at ambient temperature but typically operated at temperatures in the range of 150 C. to 250 C., the discharge electrode wires may elongate due to thermal expansion and therefore become loose. Discharge electrode wires may also become loose due to handling during erection and shipment of the discharge electrode frames.

Although a loose wire will not impede the dust collection process per se, a loose discharge electrode wire will not respond well in a rapping process. It is typical to periodically rap the discharge electrode frame to vibrate off any dust collecting on the discharge electrodes as the collection of dust thereon can lead to arcing between the discharge electrode and its neighboring collecting electrodes or even grounding by a bridging of the collected dust between the discharge electrode wire and its neighboring collecting electrodes. A loose discharge electrode wire, however, will not vibrate as well as and, therefore not clean as easily as, a properly taut discharge electrode wire.

One method of preventing discharge electrode wires from becoming loose is disclosed in Assignee's Ser. No. 480,971, Mar. 31, 1983 now Pat. No. 4,502,872, issued Mar. 5, 1985, entitled "Discharge Electrode Wire Assembly For Electrostatic Precipitator". As disclosed therein, tension coil springs are installed to extend perpendicularly between a pair of adjacent discharge electrode wires to maintain the discharge electrode wires in a taut condition. The coil springs serve to take up any looseness in the discharge electrode wires in a direction perpendicular to the electrode wires. If two neighboring discharge electrode wires become loose during operation, a tension coil spring can be installed between those two discharge electrode wires to restore both of the loose wires to their original tautness. Also, a tension coil spring may be installed between a loose wire and a neighboring tight wire to restore the loose wire to its original tautness without effecting the already tight wire.

On discharge electrode wires that are within arms reach of access platforms installed in the precipitator at either end of the collection chamber, the tension coil springs can be installed by hand with relative ease if those wires are within arms reach. However, it is very difficult for a workperson to get between rows of collecting electrode plates to install springs on discharge electrode wires out of arms reach of the ends of the collecting chamber.

Therefore, it is an object of the present invention to provide an apparatus for installing tension coil springs under tension at locations out of arms reach. More particularly, it is an object of the present invention to provide an apparatus particularly adapted for installing tension coil springs between the discharge electrode wires disposed within a rigid frame-type discharge electrode assembly located out of arms reach of the end of the assembly.

SUMMARY OF THE INVENTION

An apparatus for installing a tension coil spring comprising a longitudinally elongated support rod; a first spring engagement means mounted stationarily to the support rod at one end thereof for engaging one end of the tension coil spring to be installed; a second spring engagement means supported from and translatably movable along the support rod for engaging the other end of the tension coil spring to be installed so that the tension coil spring extends between the first and second spring engagement means; and a spring tensioning means operatively associated with the support rod for selectively positioning the second spring engagement means along the support rod so as to adjust the tension on the tension coil spring whereby the length of the tension coil spring is elongated as necessary for installation.

Preferably, the spring tensioning means comprises a support handle means supported from and translatably movable along the support rod and having a handle extending therefrom at the end of the support rod opposite the first spring engagement means with the second spring engagement means disposed therebetween; a spring tensioning lever arm pivotally mounted at one end to the handle support means; and cable means extending from the spring tensioning lever arm to the second spring engagment means for attaching the handle support means to the second spring engagement means so that the second spring engagement means may be selectively positioned along the support rod by moving the handle support means along the support rod to set the initial extension of the coil spring and by pivoting the spring tensioning lever arm to fine tune the extension of the coil spring during the installation process.

Further, plate means are preferably mounted to the end of the support rod outboard of the first spring engagement means for providing a light colored background surface for viewing the first and second spring engagement means against. Also, it is preferred that light producing means be mounted through the support rod intermediate the second spring engagement means and the spring tensioning means for illuminating the first and second spring engagement means during the installation of the tension spring.

BRIEF DESCRIPTION OF THE DRAWING

The present invention will be better understood and the above and other objects of the present invention will become more apparent and appreciated when viewed in light of the following description of a preferred embodiment with reference to the accompanying drawing wherein the apparatus of the present invention is illustrated in the installation of a tension coil spring between two discharge electrode wires of a rigid frame discharge electrode assembly.

DESCRIPTION OF A PREFERRED EMBODIMENT

Figure 1:
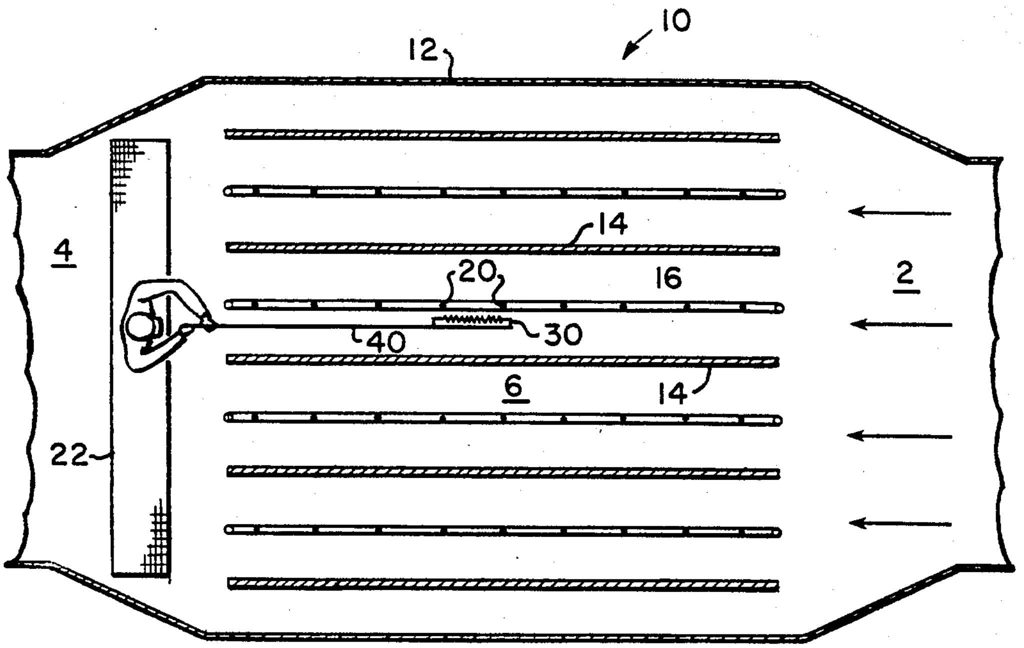
FIG. 1 is a cross-sectional view illustrating the apparatus of the present invention being utilized to install a coil spring between two discharge electrode wires.

Referring now to the drawing, and more particularly to FIG. 1, there is depicted therein an electrostatic precipitator 10 having a casing 12 defining an inlet 2, an outlet 4 and a precipitation chamber 6 disposed therebetween. The particulate flue gas to be cleaned passes horizontally through the casing 12 of the precipitator 10 passing from the gas inlet 2 through the precipitation chamber 6 and out the precipitator gas outlet 4 as a clean, relatively particulate free gas. A plurality of substantially rectangular collecting electrode plates 14 are disposed in substantially parallel, spaced relationship in vertical planes within the precipitation chamber 6. Interdisposed in the spaces between the collecting electrode plates 14 are a plurality of discharge electrode frames 16. Both the collecting electrode plates 14 and the discharge electrode frames 16 are aligned parallel to and extend in the direction of gas flow through the precipitation chamber 6 from the inlet 2 to the outlet 4 thereof.

Each of the individual discharge electrode frames 16 is formed of a plurality of tubular support members 18 welded together to form a preferably rectangular frame. Mounted within each discharge electrode frame 16 are a plurality of vertically strung discharge electrode wires 20 disposed at spaced intervals along the direction of gas flow so as to provide an electrostatic field along the length of the precipitation chamber 6. Each of the discharge electrode wires 20 is strung between the upper and lower support members 18 of the discharge electrode frame 16 in a taut condition so that when rapped they will vibrate and thereby shake off any dust particles collecting thereon. Although any number of discharge electrode wire designs well known in the art may be utilized, the typical electrode comprises a flat, thin, rectangular in cross-section strip-like element as shown in the drawing.

As mentioned previously, it is desirable that discharge electrode wires 20 be in a taut condition so that when rapped they will vibrate and thereby shake off any dust particles collecting thereon. Unfortunately, during the normal course of operation of an electrostatic precipitator, discharge electrode wires may occasionally become loose due to the effects of gas flow and temperature.

As mentioned previously, one solution to the problem of loose discharge electrode wires is to install a tension coil spring 30 between the loose discharge electrode wires, or between a loose discharge electrode wire and a taut discharge electrode wire, to return the loose wire or wires to a taut condition despite their elongation. This coil spring 30 would take up the vertical lengthening of the loose wire or wires in a horizontal direction thereby returning the wires to a taut condition. To install the coil spring 30, a workperson standing on an access platform 22 disposed at the end of the precipitation chamber 6 would reach in with the installation apparatus 40 of the present invention and attach each end of the extended coil spring 30 to and between a pair of neighboring discharge electrode wires 20 and then release the coil springs and remove the installation apparatus.

The installation apparatus 40 of the present invention is comprised of a longitudinally elongated support rod 42, first spring engagement means 50, second spring enagement means 60, and spring tensioning means 70. The longitudinally elongated support rod 42 is preferably made of a lightweight but strong material of the length necessary to facilitate reaching into the center of the precipitation chamber 6 from the support platform 22 disposed at the end thereof. Typically, the support rod 42 would be two or more meters in length. The support rod 42 may be of any desired cross-sectional shape but would typically be either square or circular in cross section.

First spring engagement means 50 is mounted stationarily to the longitudinally elongated support rod 42 at the outboard end 44 thereof. The first spring engagement means 50 engages one end of the tension coil spring 30 to be installed. The second spring engagement means 60 is supported from and is translatably movable along the longitudinally elongated support rod 42. The second spring engagement means 60 engages the other end of the tension coil 30 to be installed so that the tension coil spring 30 extends between the first and second spring engagement means 50 and 60.

To install the coil spring 30 to the discharge electrode wires 20, the second spring engagement means 60 is translated along the longitudinally elongated support rod 42 so as to adjust the length of the tension coil spring 30 so as to elongate the spring 30 to the necessary length for installation between neighboring discharge electrode wires 20. Spring tensioning means 70, operatively associated with the support rod 42, is provided for selectively positioning the second spring engagement means 60 at the proper position along the support rod 42. After the coil spring 30 has been properly lengthened, the ends of the coil spring 30 are slipped about the discharge electrode wires 20 so as to engage the discharge electrode wires 20 with one end of the spring 30 engaging one of a neighboring pair of discharge electrode wires and the other end of the spring 30 engaging the other of the pair of discharge electrode wires. After engagement has been achieved, the spring tensioning means 70 is activated to release the tension on the spring 30 thereby allowing the spring 30 to compress and restore the discharge electrode wires 20 to a taut condition. After release of the tension on the spring 30, the first and second spring engagement means 50 and 60 are removed and the installation device 40 is withdrawn from the precipitation chamber 6.

Figure 2:
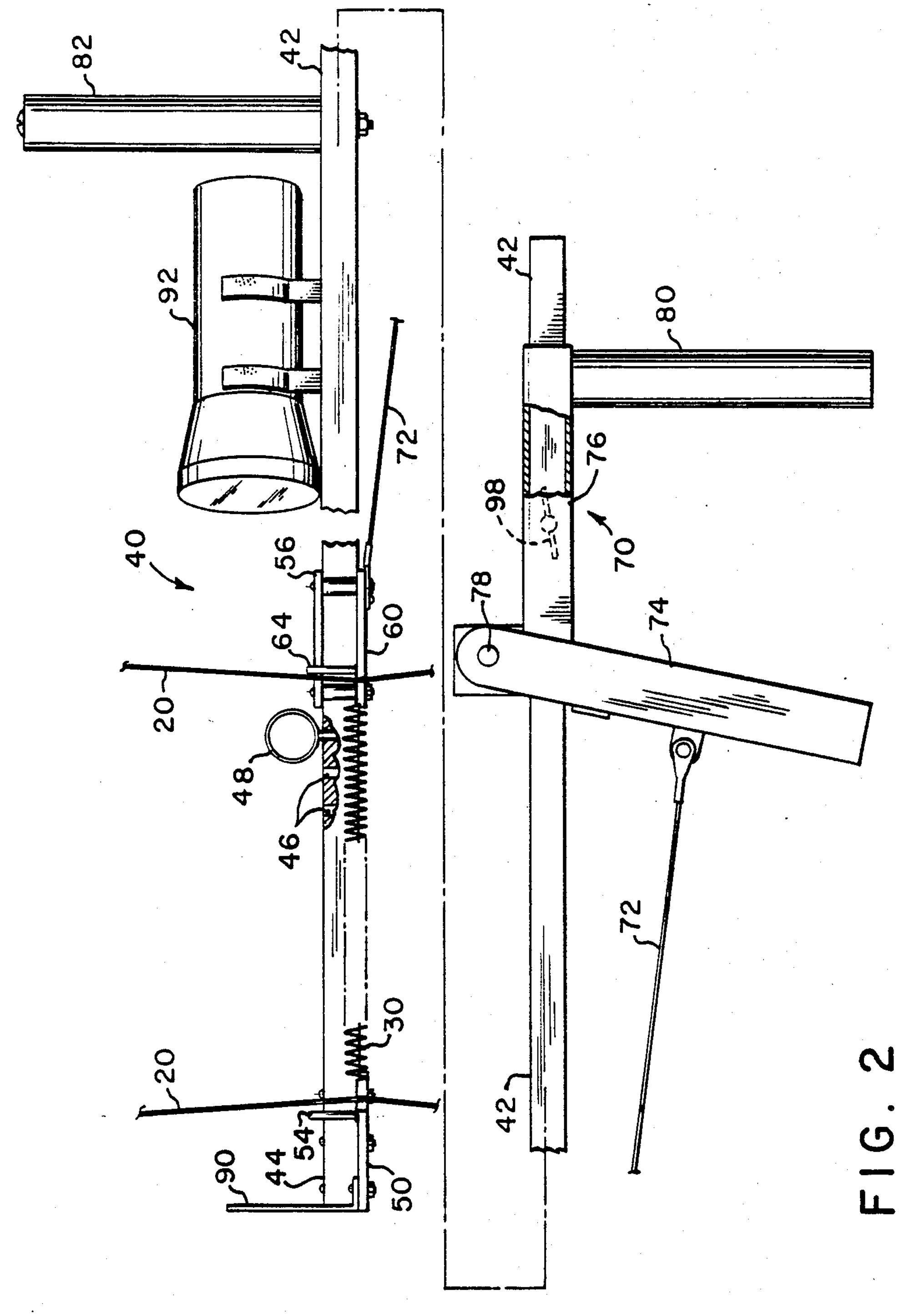
FIG. 2 is an elevational view illustrating the apparatus of the present invention.
Figure 3:
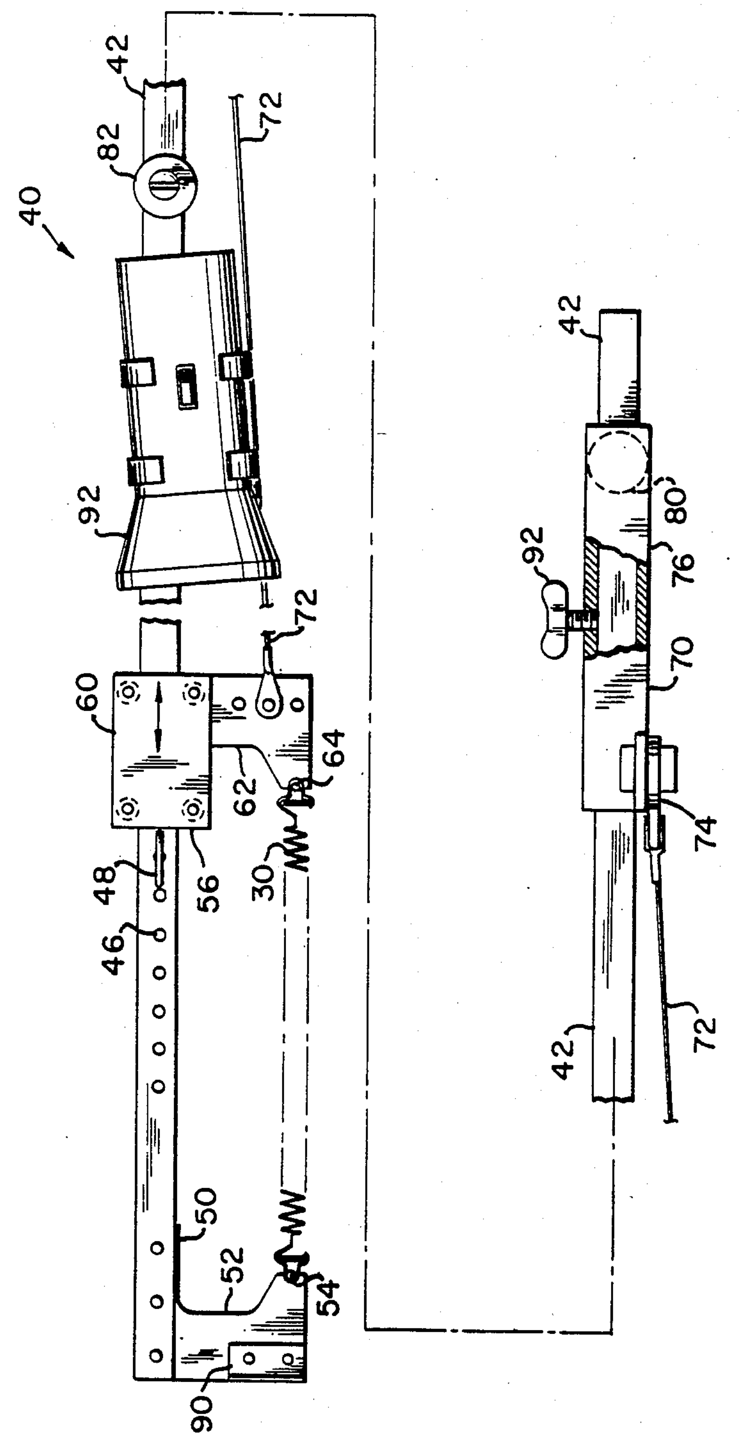
FIG. 3 is a plan view illustrating the apparatus of the present invention.

In the preferred embodiment of the installation apparatus of the present invention as shown in FIGS. 2 and 3, the first and second spring engagement means 50 and 60 comprise brackets 52 and 62 respectively which extend laterally outward from the longitudinal axis of the support rod 42 and upon which are mounted spring engagement pins 54 and 64 respectively. The first spring engagement means 50 comprises a bracket 52 mounted stationarily to the outboard end of the elongated support rod 42 and extending laterally outward from the longitudinal axis thereof. A first spring engagement pin 54 extends perpendicularly outward from the bracket 52 for engaging one end of the spring 30.

The second spring engagement means 60 comprises a bracket 62 also extending laterally outward from the longitudinal axis of the support rod 42 and supported from the support rod 42 by means of a roller assembly 56 which is translatable along the longitudinal axis of the support rod 42. A second spring engagement pin 64 extends perpendicularly outward from the bracket 62 for engaging the other end of the spring 30. In this manner, the spring 30 may be attached between the first and second spring engagement means 50 and 60 and extended to any desired length by translating the second spring engagement means 60 along longitudinal axis 42 of the support rod.

The second spring engagement means 60 is attached to the spring tensioning means 70 by cable means 72 which extends from the bracket 62 of the second spring engagement means 60 to the spring tensioning lever arm 74 of the spring tensioning means 70. The spring tensioning means 70 is comprised of handle support means 76 which is slidably translatable along the support rod 42 and from which extends laterally outward a first handle 80. The spring tensioning lever arm 74 is pivotally mounted to the handle support means 76 about pivot pin 78. The second spring engagement means 60 is translatable along the support rod 42 by translating the handle support means 76 along the support rod 42 and also by pivoting the lever arm 74 about the pivot pin 78 of the handle support means 76.

In order to facilitate the installation process, it is desirable to provide for illumination of the first and second spring engagement means during the installation process. Therefore, in the preferred embodiment shown in FIGS. 2 and 3, plate means 90 is mounted to the end of the support rod 42 outboard of the first spring engagement means 60. The plate means 90 is coated or painted to provide a light background surface for viewing the first and second spring engagement means 50 and 60 against. Preferably, the plate means 90 is mounted to the outboard edge of the bracket 52 of the first spring engagement means 50 as shown in the drawing.

Additionally, light producing means 92 is mounted to the support rod 42 intermediate the second spring engagement means 60 and the spring tensioning means 70. The light producing means 92 is aimed so as to illuminate the first and second spring engagement means 50 and 60 against the light colored background surface provided by the plate means 90 disposed at the outboard end of the support rod 42.

Figure 4:
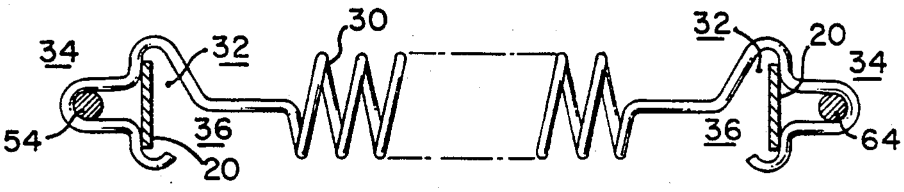
FIG. 4 is an enlarged plan view, partly in section, illustrating the attachment of one end of the coil spring to a discharge electrode wire utilizing the apparatus of the present invention.

A typical tension coil spring is illustrated in FIG. 4 of the drawing. As depicted therein, both ends of the coil spring 30 are bent to form a slot 32 into which the discharge electrode wire 20 may be inserted through opening 36. Additionally, each end of the spring 30 is formed to provide a loop 34 into which the spring engagement pins 54 and 64 may be inserted. The spring engagement pins 54 and 64 have an outside diameter which is slightly less than the diameter of the opening of loop 34 thereby facilitating the insertion and removal of the pins 54 and 64 during the installation process.

To install a tension coil spring 30 between two discharge electrodes 20, one or more of which may be loose, the workperson would select a spring of a proper length and attach one end of the spring to the first spring engagment means 50 of the installation apparatus by inserting the pin 54 mounted thereon into the loop 34 formed in that end of the spring 30 and would then attach the other end of the spring 30 to the second spring engagement means 60 by inserting the pin 62 mounted thereto into the loop 34 formed in that end of the coil spring 30. The workperson would then put the spring 30 under slight tension by translating the second spring engagement means 60 along the rod 42 away from the first spring engagement means 50. In order to insure that the spring remains under slight tension, a stop pin 48 would be inserted into one of a plurality of holes 46 drilled through the support rod 42 along the longitudinal axis thereof in the region in which the second spring engagement means 60 is translated along the support rod 42. The stop pin 48 would prevent the second spring engagement means 60 from moving along the support rod 42 back towards the first spring engagement means 50 and thereby removing the slight tension from the spring 30. It is desirable to maintain a slight tension on the spring 30 during the installation process so as to preclude the spring 30 from falling off of the pins 54 and 64 regardless of the attitude or orientation of the installation apparatus during the installation process.

Now, the workperson would translate the spring tensioning means 70 back towards him or herself and away from the first spring engagement means 50 thereby translating the second spring engagement means 60 along the longitudinal axis to a position further away from the first spring engagement means 50. The workperson would translate the spring tensioning means 70 by pulling back on the handle 80 of the handle support means 76 until the spring 30 has been extended to the approximate length necessary for installation about the discharge electrode wires 20. At this point, the workperson would secure the spring tensioning means from further translation along the support rod 42 by activating a stop device such as set screw 98 to hold the handle support means 76 in place and maintain the coil spring 30 under tension at the desired length.

At this point, the workperson would reach from platform 22 into the precipitation chamber 6 with the apparatus of the present invention to align the coil spring 30 to be installed with the discharge electrode wires 20 to which it is to be attached. The light producing means 92 would be activated to illuminate the spring attachment means 50 and 60 against the light colored background surface provided by the plate means 90. The end of the spring 30 attached to first spring engagement means 50, the stationary engagement means, will then be attached to one of the discharge electrode wires 20 by maneuvering the discharge electrode wire into the slot 32 in the coil spring 30 through the opening 36 therein. The workperson would then rotate the lever arm 74 about pivot pin 78 so as to translate the second spring engagement means 60 along the longitudinal axis of the support rod 42 so as to manuever the second discharge electrode wire 20 into the slot 32 through the opening 36 in the other end of the coil spring 30. When both ends are securely attached around the discharge electrode wires 20, the workperson would again rotate the lever arm 74 about the pivot pin 78 so as to relax the tension on the coil spring 30 thereby permitting the coil spring 30 to assume its relaxed position and bringing the loose discharge wires back into a taut condition. Having relaxed the coil spring 30, the workperson may then slip the pins 54 and 64 out of the loops 34 in the ends of the coil spring 30 thereby removing the installation apparatus from the coil spring 30 and leaving the coil spring 30 installed between the discharge electrode wires 20.

In order to facilitate handling of the installation apparatus, it is preferable to mount a second handle 82 to the support rod 44 at a location intermediate the second spring engagement means 60 and the movable handle support means 76 so as to extend laterally therefrom and provide a handhold for the operator to grip the apparatus while adjusting the lever arm 74.

Although described and illustrated herein with reference to the preferred embodiment shown in the drawing, it is to be understood that many variations of the depicted embodiment may be envisioned by those skilled in the art without departing from the basic concept of the present invention. Additionally, it is to be understood that the apparatus of the present invention may be utilized to install coil springs about wires in other devices other than an electrostatic precipitator. Accordingly, it is intended that the present invention be interpreted in spirit and in scope as defined by the claims appended hereto.

I claim:

1. An apparatus for installing a tension coil spring comprising:

a. a longitudinally elongated support rod:

b. first spring engagement means mounted stationarily to said support rod at one end thereof, said first spring engagement means for engaging one end of the tension coil spring to be installed;

c. second spring engagement means supported from and translatably movable along said support rod, said second spring engagement means for engaging the other end of the tension coil spring to be installed so that the tension coil spring extends between said first and second spring engagement means; and d. spring tensioning means operatively associated with said support rod for selectively positioning said second spring engagement means along said support rod so as to adjust the tension on the tension coil spring whereby the length of the tension coil spring is elongated as necessary for installation, said spring tensioning means comprising: handle support means supported from and translatably movable along said support rod, said handle support means having a handle extending therefrom at the end of said support rod opposite said first spring engagement means with said second spring engagement means disposed therebetween; and cable means extending from said handle support means to said second spring engagement means for attaching said handle support means to said second spring engagement means so that said second spring engagement means may be selectively positioned along said support rod by moving said handle support means along said support rod.

2. An apparatus as recited in claim 1 wherein said spring tensioning means further comprises a spring tensioning lever arm pivotally mounted at one end to said handle support means with said cable means extending from said second spring engagement means to said handle support means attached at the other end thereof, whereby said second spring engagement means may be moved along said support rod by pivoting said lever arm thereby selectively adjusting the tension on the coil spring.

3. An apparatus as recited in claim 2 further comprising a second handle mounted stationarily to and extending from said support rod intermediate said second spring engagement means and said movable handle support means.

4. An apparatus as recited in claim 1 further comprising a second handle mounted stationarily to and extending from said support rod intermediate said second spring engagement means and said movable handle support means.

5. An apparatus for installing a tension coil spring comprising:

a. a longitudinally elongated support rod;

b. first spring engagement means mounted stationarily to said support rod at one end thereof, said first spring engagement means for engaging one end of the tension coil spring to be installed;

c. second spring engagement means supported from and translatably movable along said support rod, said second spring engagement means for engaging the other end of the tension coil spring to be installed so that the tension coil spring extends between said first and second spring engagement means;

d. handle support means supported from and translatably movable along said support rod, said handle support means having a handle extending therefrom at the end of said support rod opposite said first spring engagement means with said second spring engagement means disposed therebetween;

e. a spring tensioning lever arm pivotally mounted at one end to said handle support means; and f. cable means extending from said spring tensioning lever arm to said second spring engagement means for attaching said handle support means to said second spring engagment means so that said second spring engagement means may be selectively positioned along said support rod by moving said handle support means along said support rod and pivoting said spring tensioning lever arm.

6.An apparatus as recited in claim 5 further comprising:

a. plate means mounted to the end of said support rod outboard of said first spring engagement means for providing a light background surface for viewing said first and second spring engagement means against; and b. light producing means mounted to said support rod intermediate said second spring engagement means and said spring tensioning means for illuminating said first and second spring engagement means against the light background surface provided by said plate means.

* * * * *